(12) United States Patent
Wolff et al.

(10) Patent No.: US 8,837,634 B2
(45) Date of Patent: Sep. 16, 2014

(54) METHODS AND APPARATUS FOR SIGNAL FILTERING

(71) Applicant: Nokia Siemens Networks Oy, Espoo (FI)

(72) Inventors: Gunter Wolff, Laupheim (DE); Radoslaw Ceszkiel, Wroclaw (PL)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/645,965

(22) Filed: Oct. 5, 2012

(65) Prior Publication Data

US 2014/0098905 A1   Apr. 10, 2014

(51) Int. Cl.
*H04L 25/49* (2006.01)

(52) U.S. Cl.
USPC ............................................. 375/296; 375/295

(58) Field of Classification Search
USPC .................................................. 375/296, 295
See application file for complete search history.

(56) References Cited

U.S. PATENT DOCUMENTS

2006/0091946 A1* 5/2006 Mitzlaff ........................... 330/52
2012/0234087 A1* 9/2012 Strahan et al. ............... 73/146.3

* cited by examiner

*Primary Examiner* — Michael Neff
(74) *Attorney, Agent, or Firm* — Harrington & Smith

(57) ABSTRACT

Systems and techniques for signal filtering are described. A bandpass filter is defined so as to provide for a reduced rolloff region so as to avoid interference with an adjacent carrier. Definition of the bandpass filter provides for a frequency response that compensates for loss of signal components in the rolloff region. Definition of the bandpass filter may be based at least in part on characteristics of a specified legacy filter used by devices from which signals may be received or to which signals may be transmitted.

17 Claims, 10 Drawing Sheets

METHODS AND APPARATUS FOR SIGNAL FILTERING

TECHNICAL FIELD

The present invention relates generally to telecommunications. More particularly, the invention relates to systems and techniques for control of signal filtering.

BACKGROUND

Modern cellular communication networks typically support numerous user devices, all of which are competing for limited communication resources. Communication service providers face the constant challenge of serving their many customers, many of whose activities consume significant resources, with the infrastructure and communication spectrum available to them. Adding infrastructure to meet increasing demand is costly. In addition, if the spectrum required by the demands of users is greater than the spectrum available to meet those demands, increasing infrastructure will not meet those demands.

To avoid the costs of adding infrastructure, and to help insure that the available spectrum will meet the demands placed upon it, service providers seek to use their available resources as efficiently as possible.

Management of communication resources involves adapting signals to the capacity of a communication channel, with a communication channel typically being defined by governments or consortiums of communication operators. A bandwidth for a communication channel is defined, and insuring that signals remain within the capacity of the channel is accomplished by filtering at a transmitting device and a receiving device. FIG. 1 illustrates a diagram 100 showing an overview of signal generating and processing elements that may accomplish transmission of a signal using a defined channel capacity. In broad terms, the elements are an interpolation element 102, a transmitting filter 104, a communication channel 106, a receiving filter 108, and a decimation element 110. The transmitting filter 104 restricts the transmitted signal to the limited bandwidth provided by the communication channel 106 and the receiving filter 108 separates channel transmission from interference coming from outside of the channel 106. To compensate for signal losses that can be expected as a signal passes through the transmitting filter—communication channel—receiving filter chain, the interpolation element 102 adds redundant information to the transmitted and the decimating element 110 extracts original data from the received signal.

In conventional communication systems, filters at transmitting and receiving devices are matched to achieve the maximum possible efficiency, with a transmitting filter passing the same frequencies as a receiving filter. However, various motivations may interfere with the ability to achieve desired efficiency by matching filtering. One area of interest is the management of multiple carriers. One technique for transmitting a higher density of information within a geographic area is to use multiple carriers within the same frequency band. In order to prevent interference between carriers, the carriers are separated in frequency. A rolloff region around each carrier is employed to provide for transition between carriers. Each rolloff region includes usable signal information. To insure that each transmission stays within its own channel, regulatory bodies such as the Third Generation Partnership Project (3GPP) and the United States Federal Communications Commission (FCC) and similar governmental and industry organizations define spectral mask requirements.

FIG. 2 illustrates an exemplary set of adjacent carriers, using a mask definition providing for no overlap or minimal overlap between carriers. The carriers are illustrated in a graph 200, showing power as a function of frequency for a first carrier 202 and a second carrier 204. The first carrier is subject to filtering that imposes rolloff regions 206 and 208 that begin a prescribed distance from a center frequency 210 and behave in specified ways as the distance from the center frequency 210 increases. The present discussion is directed to an arrangement of a first carrier and a second carrier, such as the first carrier 202 and the second carrier 204, and modification of rolloff regions of the first carrier, such as the rolloff regions 206 and 208, so that discussion of rolloff behavior of the second carrier 204 and other exemplary second carriers is omitted here for simplicity.

One way to test the efficiency of a communication system is through the transmission of an impulse signal. If transmission is efficient, transmission of an impulse signal will result in a single peak after decimation, as illustrated by FIG. 3, which shows a graph 300 showing a single peak 302. Transmission of a set of carriers such as those illustrated at FIG. 2 is easy to manage efficiently, because the first carrier 202 is not reduced to accommodate the second carrier 204, so that a network operator using filtering that produces a set of carriers such as those of FIG. 2 can expect that user devices will use similar filtering. However, achieving an efficient signal becomes more difficult if an operator desires to reduce the bandwidth occupied by the carriers.

Government regulatory bodies typically define the maximum frequency range allocated to an operator, but the defined maximum frequency range often allows an operator to use a smaller frequency separation between carriers than illustrated above. Therefore, in order to increase efficiency, an operator may use a second carrier at a frequency that is within the rolloff region of a first carrier. FIG. 4 illustrates a graph 400, showing the first carrier 202, with the rolloff regions 206 and 208 and the center frequency 210, but with a second carrier 404 at a frequency overlapping the rolloff region 208. In the example illustrated here, the overlap between the rolloff region 208 and the carrier 404 produces interference with the carrier 202 and the carrier 404, so that narrowing of the rolloff regions is needed to prevent such interference.

SUMMARY

In one embodiment of the invention, a method comprises configuring bandpass filtering to compensate for loss of signal components in at least one rolloff region by adding gain to signal components in a passband region and processing a signal using the configured bandpass filtering.

In another embodiment of the invention, an apparatus comprises at least one processor and memory storing a program of instructions. The memory storing the program of instructions is configured, with the at least one processor, to cause the apparatus to at least configure bandpass filtering to compensate for loss of signal components in at least one rolloff region by adding gain to signal components in a passband region and process a signal using the configured bandpass filtering.

In another embodiment of the invention, a computer readable medium stores a program of instructions. Execution of the program of instructions by a processor configures an apparatus to at least configure bandpass filtering to compensate for loss of signal components in at least one rolloff region by adding gain to signal components in a passband region and process a signal using the configured bandpass filtering.

DETAILED DESCRIPTION

Embodiments of the present invention recognize that overlap between two carriers requires reduction of the rolloff region of one or both carriers, often leading to more complex filter design. Embodiments of the invention further recognize that changes to wireless networks are often accomplished in incremental fashion, and that changes in transmission protocols should typically be made in such a way as to be compatible with existing equipment that is not being changed. In particular, embodiments of the present invention recognize that a mismatch between filtering on a transmitting device and on a receiving device can cause difficulties that need to be addressed in order to avoid inefficiency. Embodiments of the invention further recognize that reduction of carrier spacing is typically accomplished through changes to filtering, typically at a transmitting device, but that filtering used by other devices, such as receiving devices, may remain the same.

Embodiments of the present invention address filtering that achieves a reduced rolloff region used in communication with devices using filtering providing for a larger rolloff region. The filtering provided by the device compensates for the reduction in available carrier bandwidth caused by the reduction in the rolloff regions.

In an exemplary embodiment of the invention, two devices are involved in the communication, with one using a fixed filtering mechanism and the other using a filtering mechanism that is to be adapted to the fixed filtering mechanism. An adapted filtering mechanism is defined, and then appropriate operations are carried out based on the fixed filtering mechanism used in a device. The operations may involve division by a frequency response of the fixed filtering mechanism, suitably leading to a horn-shaped filter with compensation regions.

Figure 1:
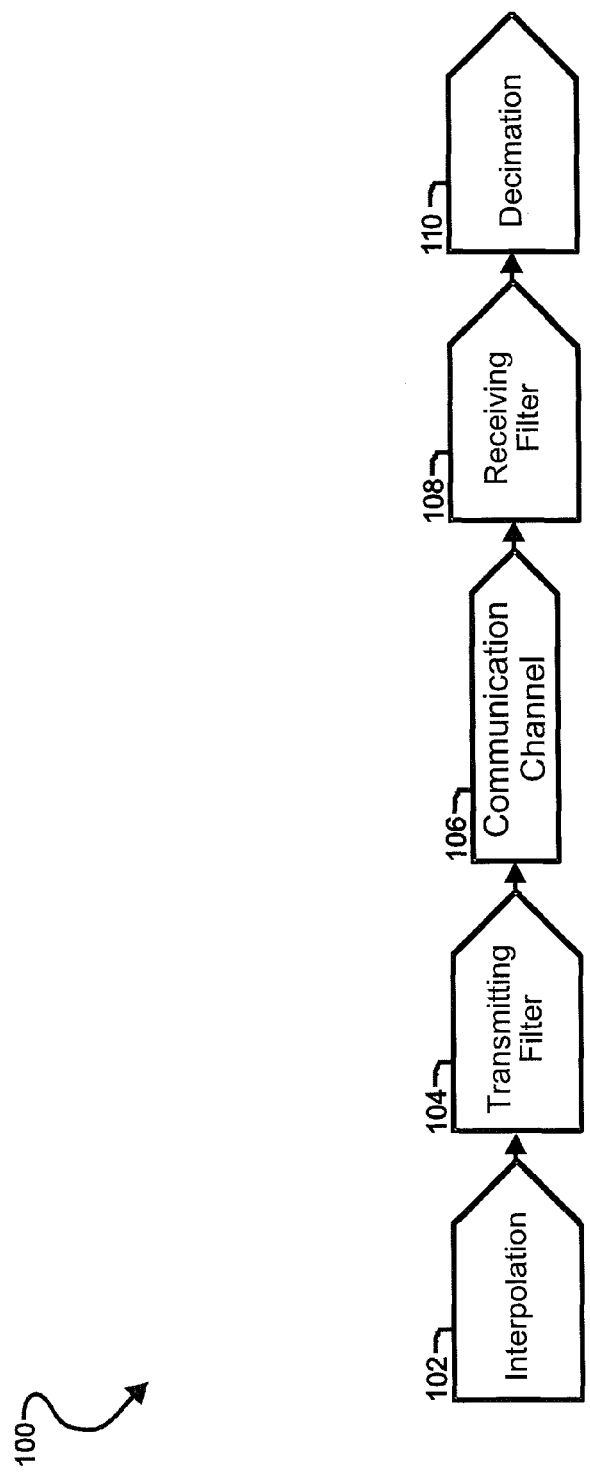
FIG. 1 illustrates a sequence of elements for transmitting and receiving a signal.
Figure 2:
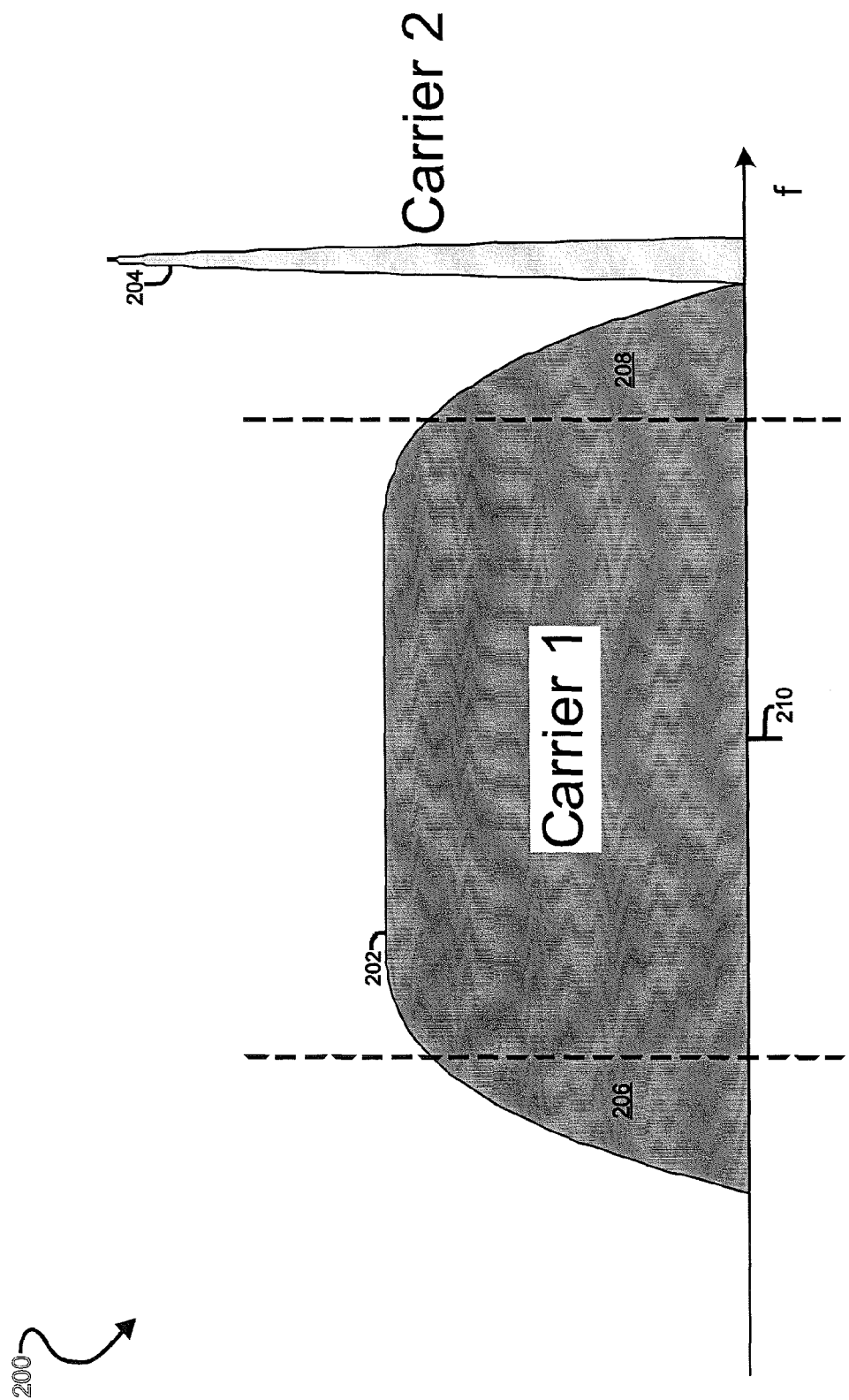
FIG. 2 illustrates a signal processed using a prior-art filtering mechanism.
Figure 3:
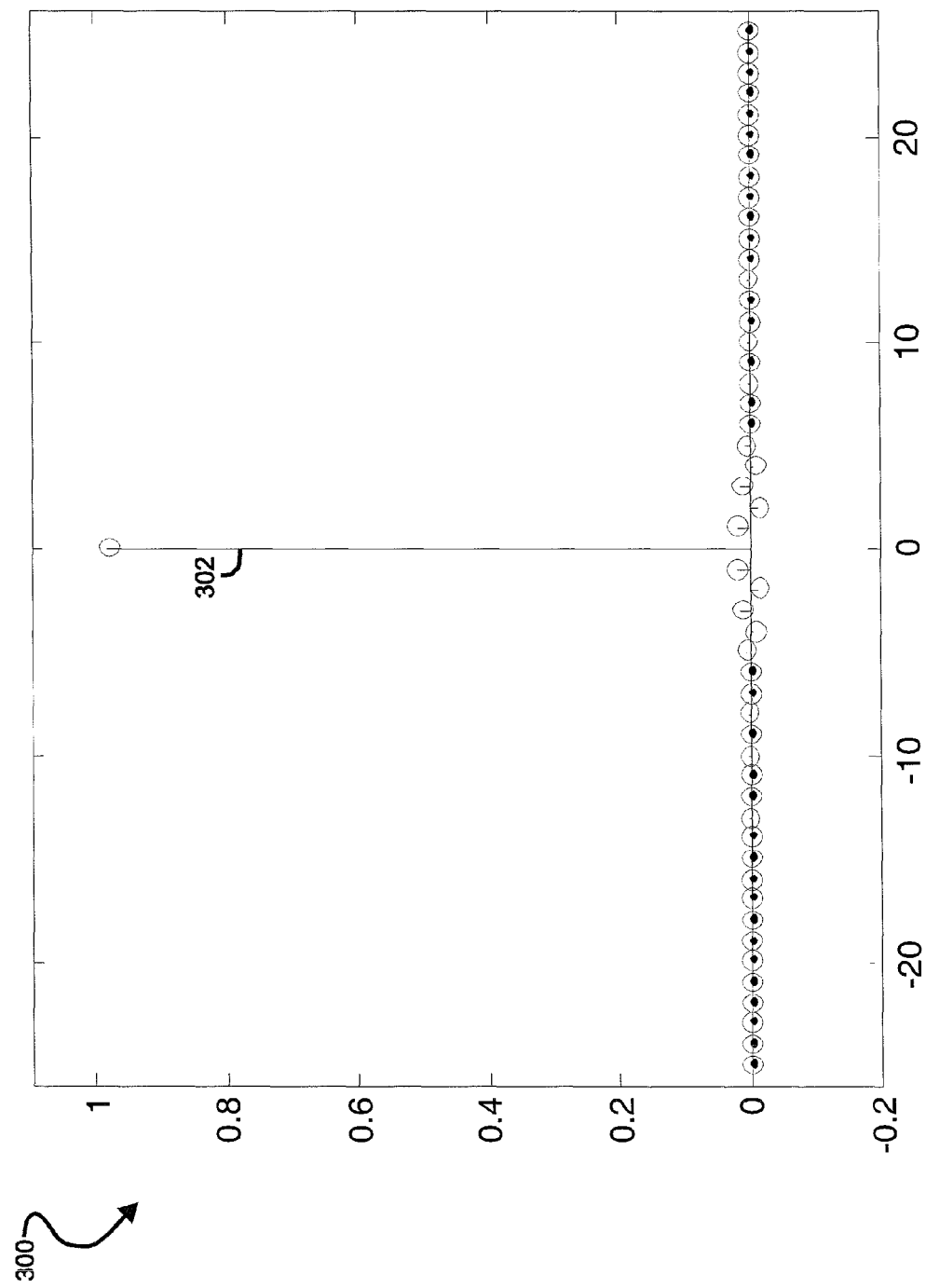
FIG. 3 illustrates a graph of an efficiently transmitted signal.
Figure 4:
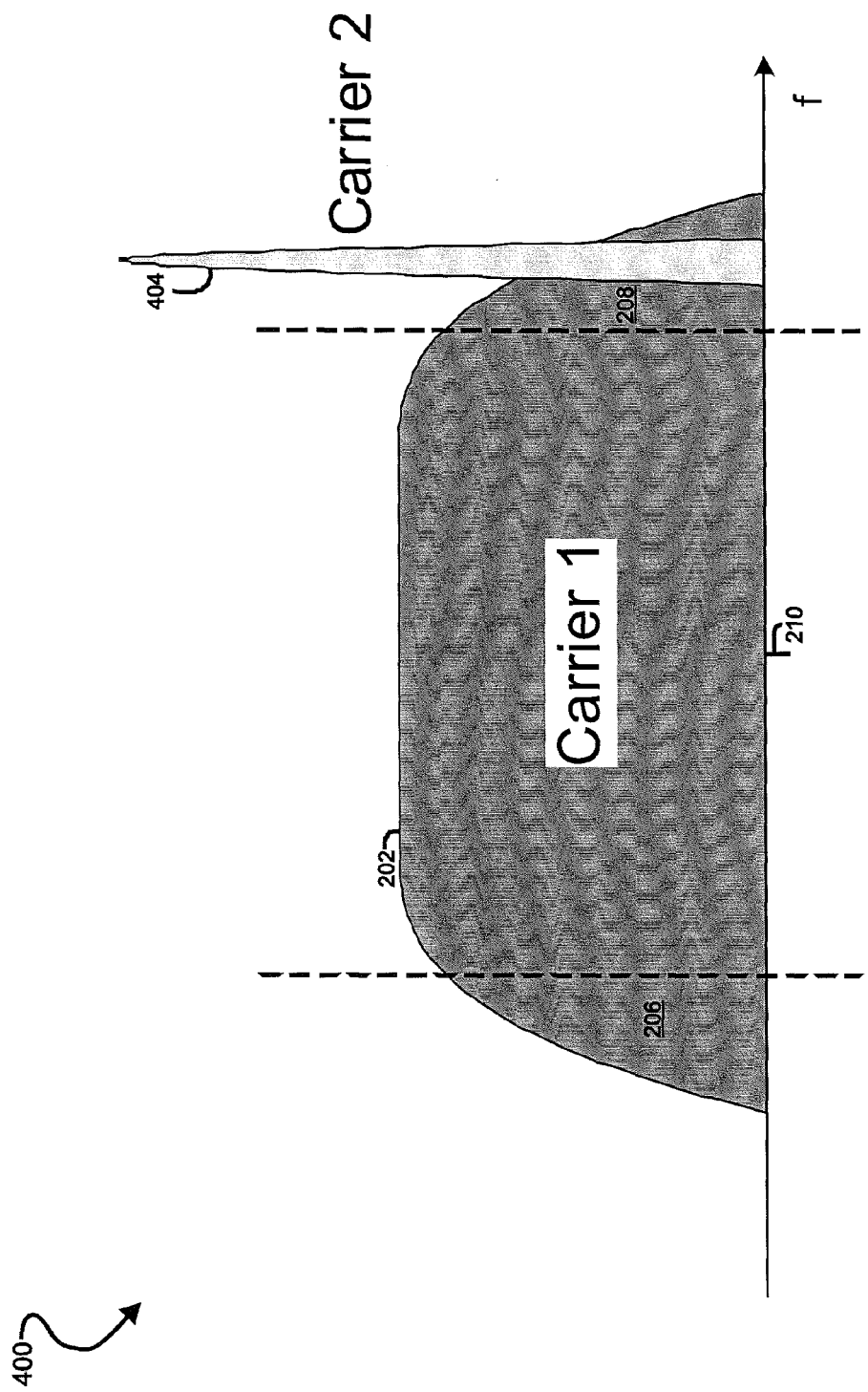
FIG. 4 illustrates a signal using an alternative prior-art filtering mechanism.
Figure 5:
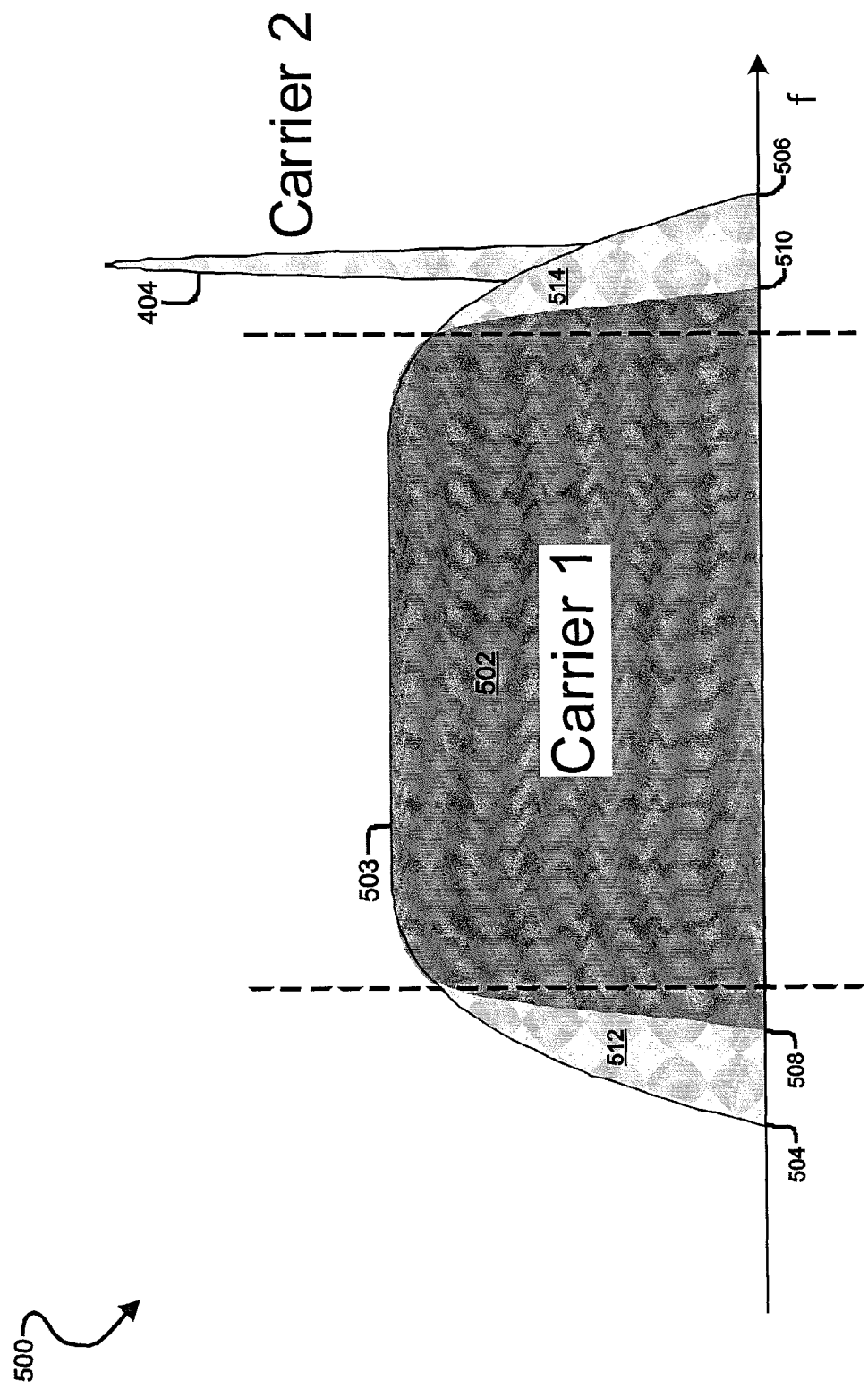
FIGS. 5 and 6 illustrate adjacent signals that exhibiting inefficiencies that may be addressed using filtering according to one or more embodiments of the present invention.

FIG. 5 illustrates a graph 500 illustrating a first carrier 502 and the second carrier 404 that may be transmitted to a receiver employing legacy filtering illustrated by the envelope 503. The legacy filtering is compatible with the carrier combination illustrated in FIG. 2 and discussed above in connection therewith. The first carrier 502 is filtered by the transmitting device so as to prevent interference with the second carrier 404, and when the first carrier 502 and the second carrier 404 are received by a device using matching filtering, there is no interference by the first carrier 502 with the second carrier 404, or by the second carrier 404 with the first carrier 502.

The legacy filter, however, passes signals from a lower frequency 504 to an upper frequency 506, even though the first carrier 502 extends only from a lower carrier frequency 508 to an upper carrier frequency 510. This filtering leaves gaps: 512, between the lower frequency 504 and the lower carrier frequency 508, and 514, between the upper carrier frequency 510 and the upper frequency 506. In the present example, the second carrier 404 does not suffer interference from the first carrier 502, because of the rolloff reduction. However, if the first carrier 502 is received, the legacy filtering envelope 503 will pass the first carrier 502, extraneous signals in the gaps 512 and 514, and the second carrier 404. The second carrier 404 will interfere with the first carrier 502. In addition, transmission of the first carrier will be inefficient because information will be lost due to the filtering that reduced the rolloff regions of the first carrier 502 compared to the frequency range passed by the legacy filter.

Figure 6:
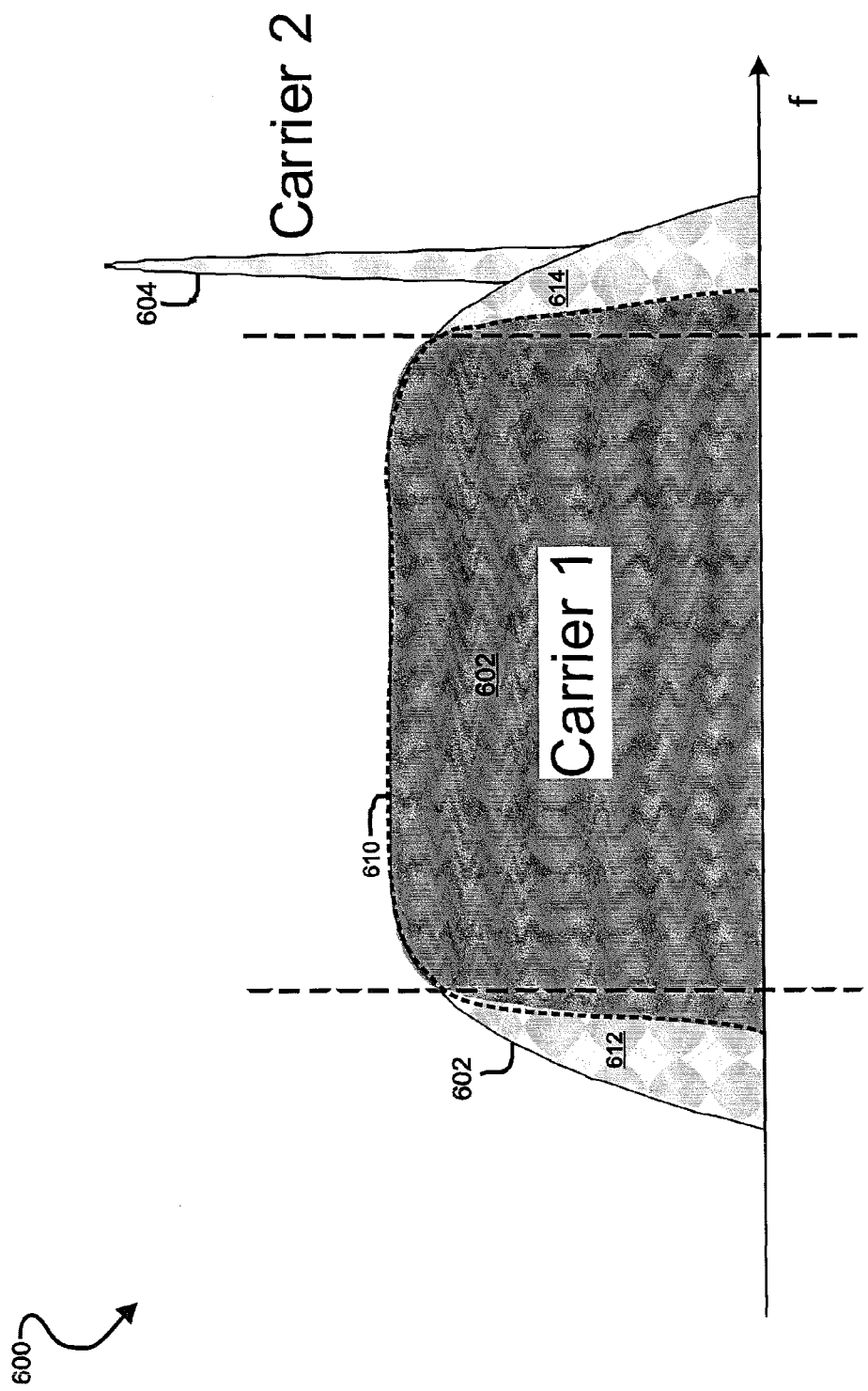

Transmission efficiency would also be compromised if a transmission made by a transmitter using legacy filtering is received by a receiver using filtering adapted to a reduced rolloff area. FIG. 6 illustrates a graph 600, showing a carrier 602, as received by a receiver using filtering defining a filter envelope 610, adapted for an environment using multiple carriers with reduced separation. In the present example, the carrier 602 includes information in the regions 612 and 614 lying beyond the filter envelope 610. Signal information in these regions is lost because it is filtered out. A wider bandwidth is transmitted by the legacy device than is used by the reduced rolloff device, because the filter envelope 610 cuts off a portion of the information. The information so cut off is not available to the reduced rolloff device, so that transmission is inefficient.

Figure 7:
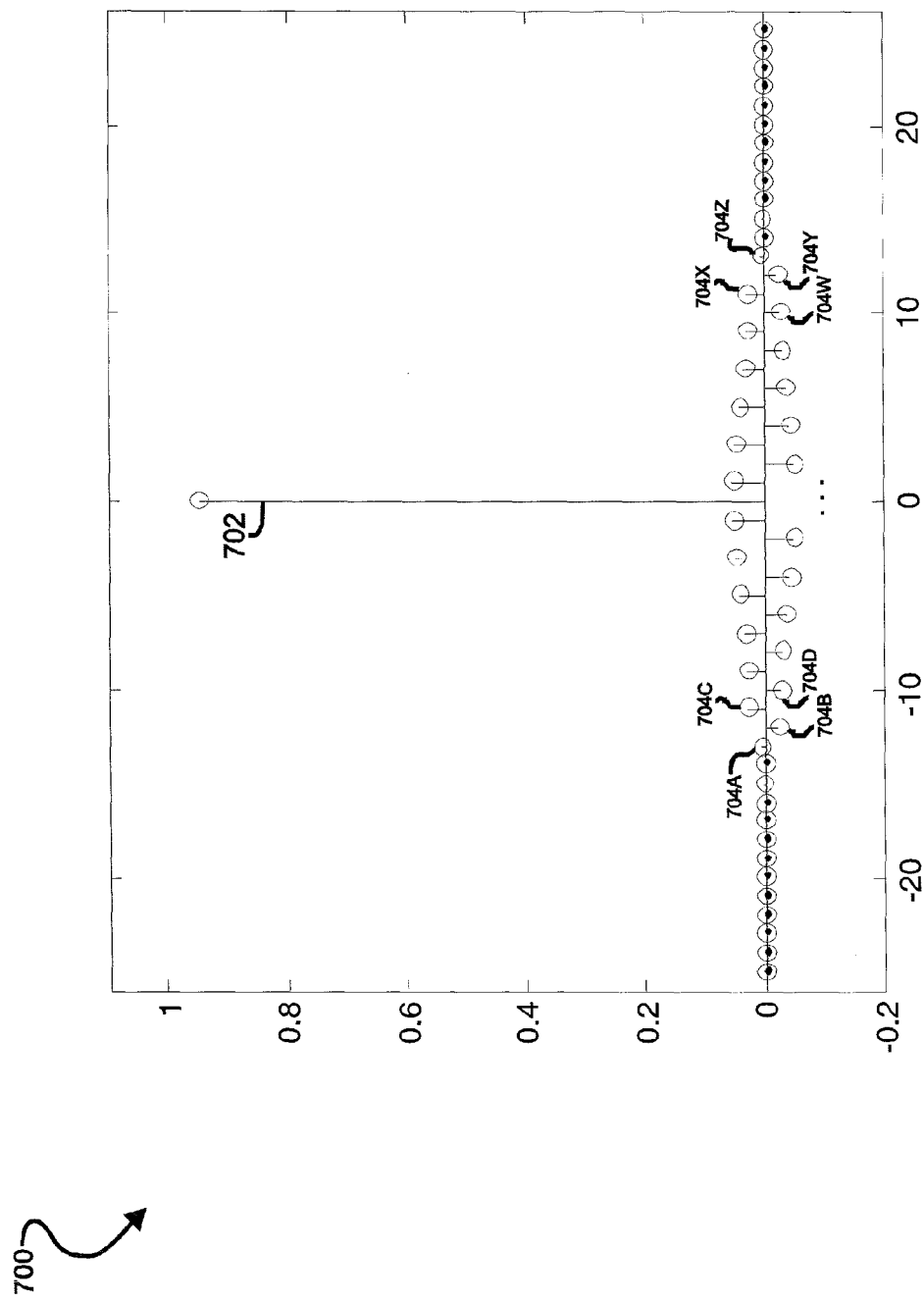
FIG. 7 illustrates a graph of an inefficiently transmitted signal.

An inefficient transmission produces not a single peak, but a set of peaks, such as the set illustrated in FIG. 7, which shows a graph 700 showing a central peak 702 and a set of smaller peaks 704A-704Z. The inefficiency illustrated here results from information loss caused by a mismatch between a transmitter filtering such as that illustrated in FIG. 5 and a receiver using legacy filtering with wider rolloff areas, or from a mismatch between a transmitter using legacy filtering with wider rolloff areas, and a receiver using filtering such as that illustrated in FIG. 6.

In order to avoid signal loss, one or more embodiments of the invention define filtering providing compensation for mismatches between filtering between transmitting and receiving devices. One or more embodiments of the present invention provide for additional gain within the Nyquist zone of a signal, to compensate for signal loss outside the Nyquist zone. A Nyquist zone defines the frequency range which is equivalent with the minimum required sampling rate to completely represent signal information with complex valued samples.

Figure 8:
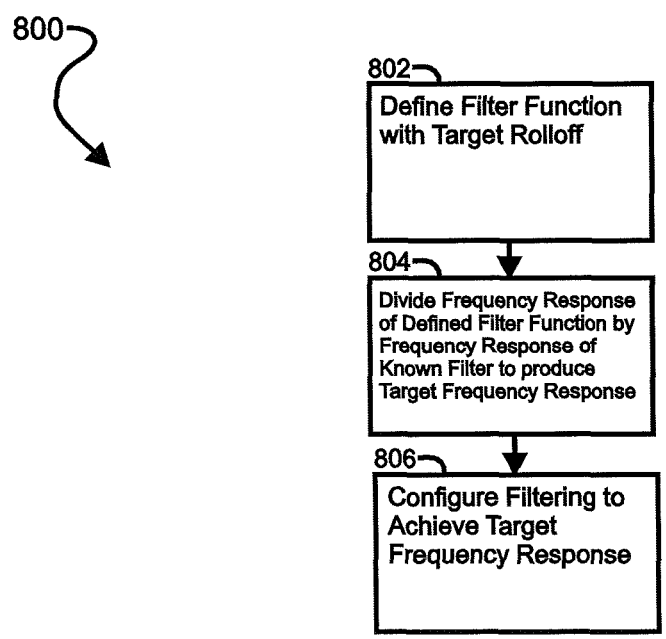
FIG. 8 illustrates a process of filtering according to an embodiment of the present invention.

FIG. 8 illustrates a process 800 for filtering configuration according to an embodiment of the present invention. The process 800 is suitably used to establish filtering that achieves desired characteristics but which must communicate with a device using filtering that cannot be adapted. The process 800 comprises defining a filter function according to specified conditions (including bandwidth restrictions). Once the filter function is defined, it is operated on based on characteristics of a known filter (such as a legacy filter) that cannot be modified. The operation produces a target filter frequency response, and filtering exhibiting this target filter frequency response is applied.

At step 802, therefore, a filter function is designed to achieve a target result. One example of such a target result is a target rolloff, such as reduced rolloff to allow for multicarrier operation. In one or more embodiments, the filter function may be an overall transmit-receive filter function. In one example, the function is defined so as to fulfill the condition that, after decimation to a Nyquist rate of a signal processed by the filter function, all signal components are to be available with their expected amplitude. For many signals so processed, a desired result is an equal spectral gain distribution. In an example, the function may also be defined so as to achieve specified signal characteristics. For example, the function may be defined so that the bandwidth of a passband and a rolloff region will be small enough to interference with adjacent carriers. In one or more embodiments of the invention, the filter function comprises a raised cosine function with a rolloff factor defined so as to meet the specified conditions.

The filter function may be defined in terms of a frequency response. At step 804, then, operations are performed to adapt the filter function to achieve efficient communication with a device using a filter that does not have matching characteristics to those of the present exemplary filter. At step 804, this frequency response is divided by a frequency response of a known filter. The known filter may be a legacy filter as described above, allowing for greater rolloff regions. The division is performed in the frequency domain and produces a target filter frequency response that produces compensation for the loss of signal components that are allowed in signals filtered by the legacy filter, but absent from signals filtered by the reduced rolloff region filter function defined at step 802.

At step 806, filtering of signals is configured so as to achieve the target filter frequency response defined at step 804. For example, a filter may be designed to achieve the target filter frequency response and a signal may be processed for transmission, or a received signal may be processed.

Figure 9:
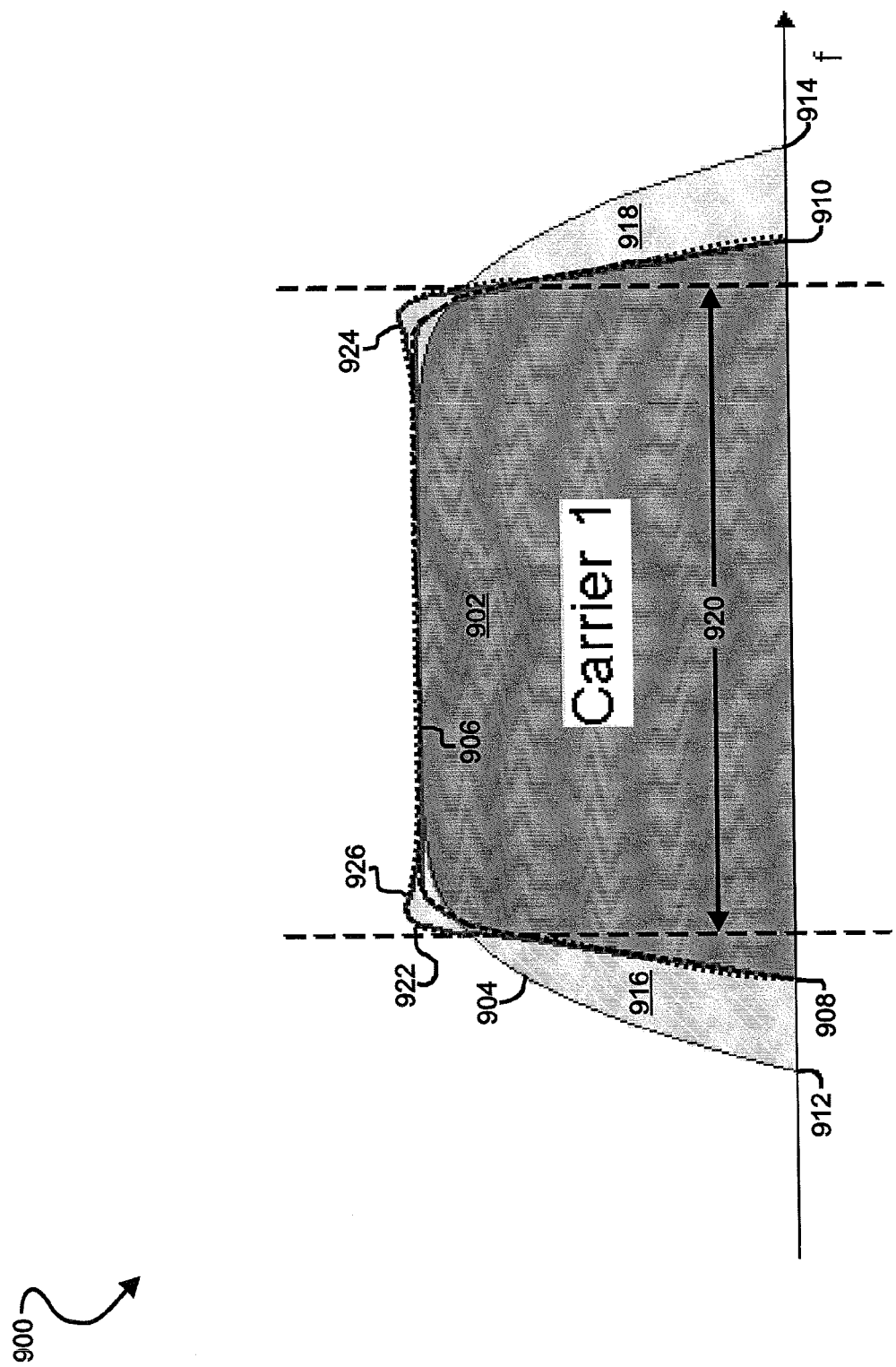
FIG. 9 illustrates signal elements considered in performing a process such as that of FIG. 8.

FIG. 9 illustrates a graph 900 showing a configuration of a carrier 902 using filtering according to one or more embodiments of the invention, adapted to produce a signal having desired characteristics but to allow for compatibility with a device using different filtering, showing here by the filter envelope 904. The carrier 902 is configured using filtering which is designed to achieve a specified target result 906. In the present example, the target result 906 includes a reduced rolloff frequency range, so that the target result 906 extends from a lower carrier frequency 908 to an upper carrier frequency 910. The configuration of the carrier 902 is adapted to provide for compatibility with filtering illustrated by the envelope 904, which extends from a lower envelope frequency 912 to an upper envelope frequency 914. The mismatch between filtering ranges results in gaps 916 and 918 between the envelope 904 and the target result 906.

A filtering mechanism according to one or more embodiments of the invention compensates for a filtering mismatch—in the present exemplary case, for losses of the components in the regions 916 and 918—by adding gain to components within the passband region, or Nyquist zone, 920. The filtering mechanisms use aliasing to compensate for missing signal components. The mechanisms described here may be used for both transmit and receive filters. In order to achieve the compensation, the target result is operated on based on the characteristics of a filter producing the envelope 904. A target frequency response illustrated by the envelope 922 is produced, including compensation regions 924 to compensate for the gap 916 and 926 to compensate for the gap 918.

The filtering produces essentially an effect of a horn filter, adding gain to spectral edges inside the Nyquist zone 920. After decimation of the filtered signal to the Nyquist rate the signal components will fall into spectral positions providing the same information as that provided by the signal before filtering. Thus, information that is lost due to reduction of the rolloff regions due to filtering by the transmitting or receiving filter, is added back within a region always passed by the filter, whether the filter is a reduced rolloff filter or a legacy filter.

Figure 10:
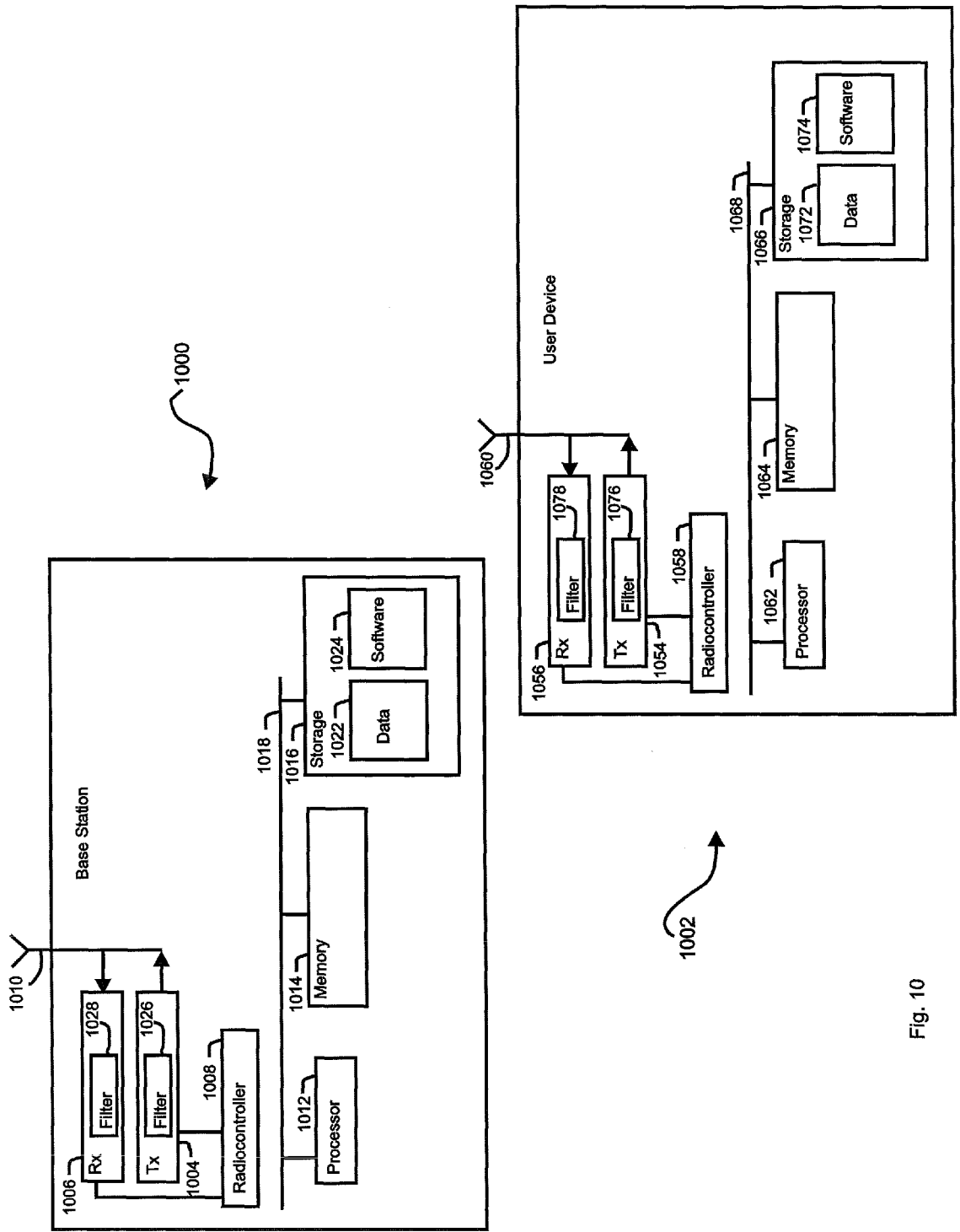
FIG. 10 illustrates mechanisms that may be used to carry out one or more embodiments of the present invention.

FIG. 10 illustrates a base station 1000 and a user device 1002 according to one or more embodiments of the present invention. The base station 1000 may include a transmitter 1004, receiver 1006, radiocontroller 1008, and antenna 1010. The base station 1000 may also include a processor 1012, memory 1014, and storage 1016, communicating with one another and with the radiocontroller 1008 over a bus 1018. The base station 1000 may also include data 1022 and software 1024, suitably residing in storage 1016 and transferred to memory 1014 as needed for use by the processor 1012.

The transmitter 1004 and receiver 1006 may include filters 1026 and 1028, respectively, with the filters 1026 and 1028 being configured or configurable to perform filtering according to one or more embodiments of the present invention. For example, the filters 1026 and 1028 may perform filtering to achieve results such as those illustrated in FIG. 9 and may be configured using mechanisms such as the process 800.

Similarly, the user device 1002 may include a transmitter 1054, receiver 1056, radiocontroller 1058, and antenna 1060. The user device 1002 may also include a processor 1062, memory 1064, and storage 1066, communicating with one another and with the radiocontroller 1058 over a bus 1068. The user device 1002 may also include data 1072 and software 1074, suitably residing in storage 1066 and transferred to memory 1064 as needed for use by the processor 1062.

In the case of the user device 1002, the transmitter 1054 and receiver 1056 may include filters 1076 and 1078, respectively, with the filters 1076 and 1078 being configured or configurable to perform filtering according to one or more embodiments of the present invention. For example, the filters 1076 and 1078 may perform filtering to achieve results such as those illustrated in FIG. 9, and may be configured using mechanisms such as the process 800.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. A method comprising:
   configuring bandpass filtering to compensate for loss of signal components in at least one rolloff region by adding gain to signal components in a passband region, wherein configuring the bandpass filtering comprises defining the filtering such that decimation to a Nyquist rate of a signal after processing by the bandpass filtering will yield all components of the signal with their expected amplitude; and processing a signal using the configured bandpass filtering.

2. The method of claim 1, wherein configuring the bandpass filtering comprises defining a combined frequency range of passband and rolloff regions so as to prevent interference with adjacent carriers.

3. The method of claim 1, wherein configuring the bandpass filtering comprises defining a raised cosine function with a specified rolloff factor.

4. The method of claim 1, wherein configuring the bandpass filtering comprises configuring a frequency response providing for an upper rolloff region and a lower rolloff region and operating on the frequency response based on a specified fixed filtering mechanism.

5. The method of claim 4, wherein the specified fixed filtering mechanism is a mechanism used by legacy devices operating in a network environment.

6. The method of claim 4, wherein each of the upper rolloff region and the lower rolloff region is narrower than a corresponding rolloff region defined by the specified fixed filtering mechanism.

7. The method of claim 4, wherein the operation is division.

8. The method of claim 4, wherein the operation is performed in the frequency domain.

9. The method of claim 1, wherein processing the signal comprises processing a wideband code division multiple access signal.

10. The method of claim 1, wherein processing the signal comprises processing a received signal.

11. The method of claim 1, wherein processing the signal comprise processing a signal for transmission.

12. An apparatus comprising:
at least one processor;
memory storing computer program code;
wherein the memory storing the computer program code is configured to, with the at least one processor, cause the apparatus to at least:

configure bandpass filtering to compensate for loss of signal components in at least one rolloff region by adding gain to signal components in a passband region, wherein configuring the bandpass filtering comprises defining the filtering such that decimation to a Nyquist rate of a signal after processing by the bandpass filtering will yield all components of the signal with their expected amplitude; and process a signal using the configured bandpass filtering.

13. The apparatus of claim 12, wherein configuring the bandpass filtering comprises defining a combined frequency range of passband and rolloff regions so as to prevent interference with adjacent carriers.

14. The apparatus of claim 12, wherein configuring the bandpass filtering comprises defining a raised cosine function with a specified rolloff factor.

15. A non-transitory computer readable medium storing a program of instructions, execution of which by a processor configures an apparatus to at least:

configure bandpass filtering to compensate for loss of signal components in at least one rolloff region by adding gain to signal components in a passband region, wherein configuring the bandpass filtering comprises defining the filtering such that decimation to a Nyquist rate of a signal after processing by the bandpass filtering will yield all components of the signal with their expected amplitude; and process a signal using the configured bandpass filtering.

16. The computer readable medium of claim 15, wherein configuring the bandpass filtering comprises defining a combined frequency range of a passband and rolloff regions so as to prevent interference with adjacent carriers.

17. The computer readable medium of claim 15, wherein configuring the bandpass filtering comprises defining a raised cosine function with a specified rolloff factor.

* * * * *